May 2, 1944.
C. H. CHAPMAN
2,348,055
ELECTRIC TRANSLATING APPARATUS
Filed Dec. 29, 1942
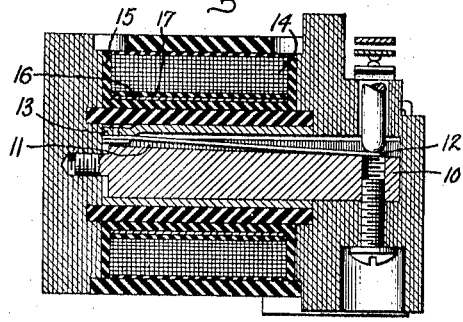
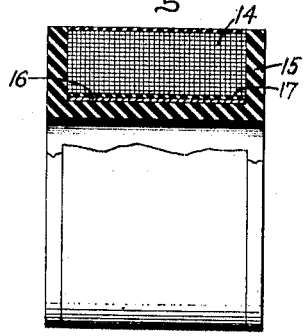
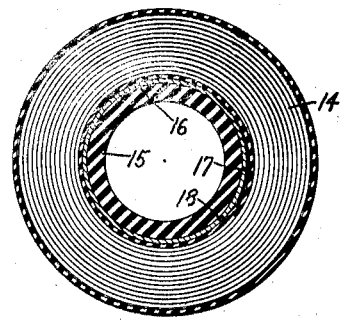
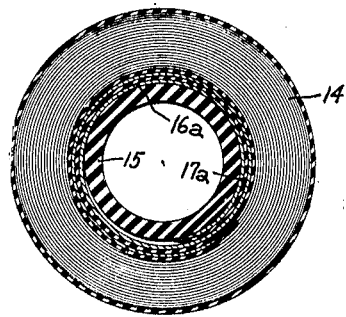
Inventor:
Charles H. Chapman,
by Harry E. Dunham
His Attorney.

Patented May 2, 1944

2,348,055

UNITED STATES PATENT OFFICE 2,348,055

ELECTRIC TRANSLATING APPARATUS

Charles H. Chapman, Scotia, N. Y., assignor to General Electric Company, a corporation of New York Application December 29, 1942, Serial No. 470,491

9 Claims. (Cl. 175—356)

My invention relates to electric translating apparatus, and more particularly to energizing coils for electric induction apparatus, electric relays, and the like. The invention is useful for varying the effective flux of an electric coil of given size and shape without changing either the number of turns or the magnitude of the current flowing through the coil. Conversely, the invention may be used to control the number of ampere turns required to obtain a predetermined flux from a coil.

Characteristically an electric relay of any particular structure requires a definite amount of flux in the core to effect actuation of the relay. Since the relay structure ordinarily determines the coil size, the required actuating flux determines the necessary ampere turn rating of the coil. Commonly such relays are supplied in different current ratings by providing the relay with any one of a number of coils of the same general size and shape but which differ inversely in their current rating and number of turns, so that the ampere turn ratings of all the coils are approximately the same. This method of increasing the current rating of a relay has definite limitations. When the current rating becomes so high that the number of turns in the coils is very small, for example, two or three turns, it will be evident that the steps between the current ratings of coils which differ by only one turn is necessarily large. For example, the current rating of a two-turn coil is 150 per cent of the current rating of a three-turn coil with the same ampere turn rating. While it is frequently desirable to provide coils having current ratings between these widely differing values, it has been found that in coils of the type described it is impossible to obtain any intermediate effect from a fractional part of a turn on the coil.

Accordingly, it is a general object of my invention to provide means for varying the current rating of electric coils of predetermined size and shape while maintaining a predetermined fixed number of turns on the coil.

It is a further object of my invention to provide means for reducing the effective or core flux established by an electric coil without changing the current or the number of turns in the coil, so that a greater current is required to supply the same flux as a similar coil not embodying my invention.

It is a specific object of the invention to provide a magnetic shunt built integrally with an electric energizing coil for shunting a portion of the coil flux from the centrally located core of the coil, thereby to control the current rating of the coil for any predetermined core flux without changing the number of turns.

My invention itself together with further objects and advantages thereof will be more fully understood by referring now to the following detailed specification taken in conjunction with the accompanying drawing in which Fig. 1 is a sectional view of an electric relay embodying my invention; Figs. 2 and 3 are enlarged sectional views of the energizing coil shown on the relay of Fig. 1; and Fig. 4 is a sectional view of a coil for a relay or other translating apparatus embodying my invention in modified form.

Referring now to the drawing, and particularly to Fig. 1, I have shown by way of illustration the application of my invention to a thermal overload relay of the induction type. Apart from the improved energizing winding, which embodies the features of my invention, the structure of the relay of Fig. 1 is described in detail and claimed in Patent 2,051,380 issued on August 18, 1936, to B. W. Jones. In view of the foregoing patent a detailed description of the core, frame and contact structure of the relay is not necessary here, but in principle the relay comprises a transformer having a short circuited secondary winding and a thermal responsive member positioned in thermal transfer relation to the secondary winding. More specifically, the relay comprises a magnetizable iron core 10 slotted or otherwise cut away longitudinally at 11 to receive a thermally deformable bimetallic strip 12. The core 10 is surrounded by a cylindrical copper conductor 13 which serves as a short circuited secondary winding arranged in transformer relation with respect to an energizing or primary winding 14.

Referring now more particularly to the enlarged sectional views of Figs. 2 and 3, it may be noted that the relay energizing coil which I have shown in connection with the relay of Fig. 1 comprises the current conducting winding 14 and a supporting coil spool 15 formed of suitable insulating material. In accordance with my invention, I provide a magnetic shunt for diverting a portion of the flux established by the winding 14 from the relay core 10. As shown, this magnetic shunt is built integrally into the coil upon the spool 15 and adjacent the inner turns of the winding 14. It is in the form of a lamina 16 of magnetizable material nearly encircling the spool 15 at the base of the winding 14 and separated from the winding by an overlying lamina 17 of suitable insulating material. As shown at Fig. 3, the magnetic shunt 16 is substantially cylindrical but is provided with a longitudinal gap 18 so that the shunt nowhere forms a closed metallic path around the core 10. The gap 18 thus prevents the flow of circulating currents which would otherwise flow in the shunt if the shunt formed a complete short-circuited turn about the core.

While I have shown at Fig. 3 a shunt 16 formed of substantially one complete turn of magnetizable sheet material on the spool 15, it will be clear that the reluctance of the shunt 16 may be controlled as desired by providing either more or less than one complete turn as required. For example, at Fig. 4, I have shown another embodiment of my invention in which the magnetic shunt 16a comprises a plurality of turns of thin magnetizable sheet material interwound with a lamina 17a of suitable insulating material. It will be noted that by interwinding the shunt 16a with the insulating material 17a, no complete short circuited current path is provided through the shunt.

The two embodiments of the invention described above are similar insofar as the shunt is positioned upon the core 15 at the base of the winding 14. It will, however, be understood by those skilled in the art that my invention is not limited, in its broader aspects, to this particular arrangement. The principle of the invention lends itself equally well to the interposition of the magnetic shunt between any desired layer of turns of the winding 14 so long as the shunt 16 is positioned in the region of the inner turns of the winding.

By way of example to illustrate the effectiveness of the invention, it is interesting to note that in a typical device I have found that a single turn of steel 19 mils thick wrapped upon a given relay coil in the manner illustrated in Fig. 3 resulted in increasing the ampere turns required for tripping the relay by approximately 25 per cent. The same coil with two complete turns of a similar steel shunt wrapped in the manner of Fig. 4 was found to require an increase of approximately 71 per cent in the ampere turns necessary for tripping the relay. From these figures it will be evident that by suitably proportioning the cross sectional size of the shunt the desired variations of coil rating, as pointed out in the first part of this specification, may easily be attained.

It is to be noted that the relay illustrated at Fig. 1 does not provide a closed flux path of magnetizable material between the relay core and frame. In certain types of relays and other translating apparatus where such a closed iron flux path is provided, the reluctance of the normal flux path through the core may be so low that the open flux path through the shunt of my invention to be effective must be a rather large cross section. Thus, while an effective shunting effect is obtained with such an arrangement, it will be understood that my invention has its greatest application to electric apparatus in which the flux path through the core of the coil is marked by "non-magnetic" sections of substantial reluctance.

While I have illustrated only certain preferred embodiments of my invention by way of illustration, many further modifications will undoubtedly occur to those skilled in the art, and I therefore wish to have it understood that I intend in the appended claims to cover all such modifications as fall within the true spirit and scope of my invention.

What I claim as new and desire to secure by Letters Patent of the United States is:

1. An electromagnetic relay comprising a magnetizable core, means energized in accordance with the magnetic flux traversing said core, an energizing coil mounted upon said core including a current conducting winding and supporting means therefor, and a circumferentially discontinuous magnetizable member integral with said coil and extending longitudinally of said core adjacent the inner turns of said winding and for substantially the full length of said coil, thereby to shunt a portion of the magnetic flux of said winding from said core.

2. An electromagnetic relay comprising a magnetizable core, means energized in accordance with the magnetic flux traversing said core, an energizing coil surrounding said core comprising a supporting spool and a current conducting winding carried thereby, and a magnetic shunt for said core mounted upon said spool adjacent the inner turns of said winding as an integral part of said coil, said shunt extending longitudinally of said core for substantially the full length of said coil.

3. An electromagnetic relay comprising a magnetizable core, means energized in accordance with the magnetic flux traversing said core, an energizing coil surrounding said core comprising a supporting spool and a current conducting winding carried thereby, and a magnetizable lamina wound upon said spool integrally with said coil adjacent the inner turns of said winding to shunt a portion of the magnetic flux of said winding from said core.

4. An electromagnetic relay comprising a magnetizable core, means energized in accordance with the magnetic flux traversing said core, an energizing coil surrounding said core comprising a supporting spool and a current conducting winding carried thereby, and a circumferentially discontinuous layer of magnetizable material interposed between the core of said spool and the base of said winding to shunt a portion of the magnetic flux of said winding from said core, said layer extending longitudinally of said core for substantially the full length of said coil.

5. An electromagnetic relay comprising a magnetizable core, means energized in accordance with the magnetic flux traversing said core, an energizing coil surrounding said core comprising a supporting spool and a current conducting winding carried thereby, and a lamina of magnetizable material interwound upon said spool with a sheet of insulating material at the base of said winding, said lamina forming a plurality of turns about said core.

6. An electric translating apparatus comprising a magnetizable core, means energized in accordance with the magnetic flux traversing said core, an energizing coil mounted upon said core for establishing said magnetic flux in said core, said coil comprising a multiturn current conducting winding, and magnetizable means extending longitudinally of said core for substantially the full length of said coil and wound integrally with said coil adjacent the inner turns of said winding to shunt a portion of the magnetic flux of said coil from said core.

7. An electric induction apparatus comprising a magnetizable core, a secondary winding surrounding said core for generating an electromotive force proportional to the rate of change of magnetic flux in said core, an energizing coil surrounding said secondary winding for establishing said magnetic flux in said core, and magnetizable means extending longitudinally of said core for substantially the full length of said coil and wound integrally with the turns of said coil to shunt a portion of the flux of said coil from said core.

8. An electric induction apparatus comprising a magnetizable core, a short circuited annulus of electrically conducting material surrounding said core, an energizing coil comprising a spool of insulating material surrounding said annulus and a multiturn current conducting winding wound upon said spool, and a lamina of magnetizable material interwound upon said spool with a lamina of insulating material adjacent the inner turns of said winding thereby to shunt from said core a portion of the magnetic flux established by said coil.

9. An electric induction relay comprising a magnetizable core having a slot extending longitudinally thereof, a thermal responsive actuating member disposed in said slot, a short circuited annulus of electric conducting material surrounding said core and said thermal responsive member, an energizing coil surrounding said short circuited annulus and comprising a spool of insulating material and a multiturn current conducting winding upon said spool, and a magnetic shunt for said core comprising a lamina of magnetizable material interwound with a lamina of insulating material upon said spool and at the base of said winding, thereby to shunt from said core a portion of the magnetic flux established by said coil.

CHARLES H. CHAPMAN.